(12) United States Patent
Hagen (10) Patent No.: US 8,967,193 B2
(45) Date of Patent: Mar. 3, 2015

(54) DEVICE FOR VENTILATING AND AERATING A FUEL TANK

(75) Inventor: Harald Hagen, Creussen (DE)

(73) Assignee: Audi AG, Ingolstadt (DE)

( * ) Notice: Subject to any disclaimer, the term of this patent is extended or adjusted under 35 U.S.C. 154(b) by 494 days.

(21) Appl. No.: 13/328,354

(22) Filed: Dec. 16, 2011

(65) Prior Publication Data

US 2012/0160219 A1  Jun. 28, 2012

(30) Foreign Application Priority Data

Dec. 21, 2010 (DE) .......................... 10 2010 055 312

(51) Int. Cl.
| | |
|---|---|
| F16K 17/26 | (2006.01) |
| F16K 24/00 | (2006.01) |
| B60K 15/035 | (2006.01) |
| F02M 25/08 | (2006.01) |
| B60K 15/03 | (2006.01) |

(52) U.S. Cl.
CPC ...... B60K 15/03519 (2013.01); F02M 25/0836 (2013.01); B60K 2015/03514 (2013.01); B60K 2015/03566 (2013.01); B60K 2015/03276 (2013.01); B60K 2015/03302 (2013.01)
USPC ...................... 137/493.8; 137/493; 137/493.9; 123/520

(58) Field of Classification Search
USPC .............. 123/516, 518–521; 137/493, 493.8, 137/493.9, 601.13, 601.2, 601.21
See application file for complete search history.

(56) References Cited

U.S. PATENT DOCUMENTS

| | | | | |
|---|---|---|---|---|
| 4,893,643 | A | * | 1/1990 | Gifford et al. ................. 137/202 |
| RE34,518 | E | * | 1/1994 | Covert et al. .................. 137/588 |
| 5,429,097 | A | | 7/1995 | Wojts-Saary et al. |
| 6,142,167 | A | * | 11/2000 | Pettesch ........................... 137/39 |
| 6,851,443 | B2 | * | 2/2005 | Veinotte et al. .................... 137/2 |
| 7,325,577 | B2 | * | 2/2008 | Devall .............................. 141/59 |
| 8,469,051 | B2 | * | 6/2013 | Bittner et al. .............. 137/493.4 |
| 2003/0089345 | A1 | * | 5/2003 | Itou et al. ....................... 123/520 |
| 2006/0081801 | A1 | | 4/2006 | Takahashi et al. |
| 2006/0185652 | A1 | * | 8/2006 | Tsuge et al. .................. 123/519 |
| 2008/0251139 | A1 | * | 10/2008 | Wang et al. ................... 137/493 |
| 2008/0295893 | A1 | * | 12/2008 | Bittner et al. .............. 137/116.3 |
| 2011/0162726 | A1 | | 7/2011 | Ito et al. |

(Continued)

FOREIGN PATENT DOCUMENTS

| | | |
|---|---|---|
| DE | 42 41 274 C1 | 1/1994 |
| DE | 11 2004 000 114 B4 | 1/2009 |

(Continued)

*Primary Examiner* — Thomas Moulis
*Assistant Examiner* — Joseph Dallo
(74) *Attorney, Agent, or Firm* — Henry M. Feiereisen LLC (57) ABSTRACT

A device for ventilating and aerating a fuel tank includes a tank shut-off valve and two tank pressure control valves. One of the tank pressure control valves opens in response to an overpressure in the fuel tank and the other one of the tank pressure control valves closes in response to a negative pressure in the fuel tank. A valve unit which is formed from one or multiple of the valves is mountable vertically or horizontally and has a fuel connection which communicates with the fuel tank and a filter connection which communicates with an activated carbon filter. The two connections are generally oriented parallel and point downwards in vertical mounting position of the valve unit and in sideward direction(s) in horizontal mounting position of the valve unit and are arranged at or near the bottom side of the valve unit.

15 Claims, 10 Drawing Sheets

(56) References Cited

U.S. PATENT DOCUMENTS

2011/0192382 A1* 8/2011 Ogaki et al. ............ 123/518
2012/0160220 A1* 6/2012 Hagen ..................... 123/520
2012/0168454 A1* 7/2012 Hagen ..................... 220/746
2012/0179354 A1* 7/2012 Hagen ..................... 701/102

FOREIGN PATENT DOCUMENTS

| | | |
|---|---|---|
| JP | 2006 017 129 A | 1/2006 |
| WO | WO 2010/023806 A1 | 3/2010 |

* cited by examiner

DEVICE FOR VENTILATING AND AERATING A FUEL TANK

CROSS-REFERENCES TO RELATED APPLICATIONS

This application claims the priority of German Patent Application, Serial No. 10 2010 055 312.3, filed Dec. 21, 2010, pursuant to 35 U.S.C. 119(a)-(d).

BACKGROUND OF THE INVENTION

The invention relates to a device for ventilating a fuel tank.

Devices of the aforementioned type are provided in motor vehicles between the fuel tank and an activated carbon filter, which is intended to prevent an undesired release of volatile hydrocarbons from the fuel tank into the environment of the motor vehicle. The tank shut-off valve is a controllable valve, for example an electromagnetic valve which is normally closed and is opened during refueling of the fuel tank, to conduct a gas mixture which is displaced from the tank, through the activated carbon filter and to adsorb the hydrocarbons (HC) contained in the gas mixture, so that only purified air is released into the environment. The two tank pressure control valves are an overpressure valve and a negative pressure valve, which are also normally closed. The overpressure valve opens automatically, when a predetermined overpressure is established inside the fuel tank as a result of evaporation of fuel inside the fuel tank, for example when ambient temperatures rise or during a residual heating period after turning off the internal combustion engine, while the negative pressure valve opens automatically when a predetermined negative pressure is established inside the fuel tank as a result of fuel condensing inside the fuel tank, for example when ambient temperatures fall.

Known devices of this type are usually configured as valve unit or valve assembly, in which the tank shut-off valve and the two tank pressure control valves which are configured as bypass valves are combined. Depending on the configuration, these valve units are mostly constructed so that a tank connection, which communicates with the fuel tank and a filter connection of the valve unit which communicates with the activated carbon filter point in different directions or project in different directions over the valve unit, respectively. This ensures an optimal draining of condensate in only one mounting position of the valve unit, while in other mounting positions so called dead fuel regions can occur from which the fuel can no longer drain. When the condensate contains moisture, this can lead to a freezing in the case of low ambient temperatures and especially in the tank shut-off valve can lead to damage to or destruction of the valve.

SUMMARY OF THE INVENTION

Taking the foregoing into account, the invention is based on the object to improve a device of the aforementioned type in such a way that the valve unit can be installed in different mounting positions, without compromising the drainage of condensate.

According to the invention, this object is solved in that the two connections are generally oriented parallel, wherein in a vertical mounting position of the valve unit they face toward the bottom and, in a horizontal mounting position of the valve unit they face in sideward direction(s) and are arranged at or near the bottom side of the valve unit. Because in this case both connections face obliquely downwards, an unimpeded drainage of the condensate from the valve unit is ensured in all mounting positions.

In a preferred embodiment of the invention, the valve unit includes two parts which are rotatable relative to each other, one of which is provided with fastening means for fastening the valve unit on a mounting and one is provided with the two connections. This allows in a horizontal or oblique mounting position of the valve unit to easily rotate the two connections into the position where they are located at the lowest point below the rotational axis, by rotating the part, which is provided with the connections, relative to the other part, regardless of the orientation of the mounting which serves for mounting the valve unit. Preferably, the valve unit has means with which the two parts can be fixed in any rotational position relative to one another, for example a clamping ring.

This embodiment is particularly well suited when the valve unit includes the tank shut-off valve, which is usually configured as magnetic valve with a valve part and an actuating part. Expediently, in this case, the valve part together with the two connections is rotatable relative to the actuating part about a longitudinal middle axis of the tank shut-off valve, which beside the fastening means expediently includes an electromagnetic coil and an anchor for actuating the tank shut-off valve.

In particular in valve units with a tank shut-off valve, an especially good condensate drainage is also achieved in that according to a further preferred embodiment of the invention each of the two connections leads into an internal space of the valve unit, wherein in horizontal as well as vertical mounting position, the entry sites of the connections into the internal spaces are arranged at the lowest point of the respective internal space. To further facilitate the draining of the condensate into the entry sites of the connections, the connections are at least partially surrounded by oblique surfaces which are inclined downward toward the entry sites. In a horizontal mounting position, the two connections of the valve unit preferably point in the same direction, such that they both point downward in vertical mounting position.

In an advantageous alternative embodiment, the valve unit includes the two tank pressure control valves as well as the tank shut-off valve which is provided with the two connections, and the two tank pressure valves are mounted on the tank shut-off valve so that they communicate with the two connections through the tank shut-off valve. In this case, two connections are sufficient for all three valves.

In another alternative embodiment, the valve unit includes only the tank shut-off valve or only the two tank pressure control valves, which has the advantage that the tank shut-off valve and the two tank pressure control valves can be mounted separate from one another and/or mounted in different mounting positions, for example the two tank pressure valves inside the fuel tank and the tank shut-off valve outside the fuel tank The fundamental configuration of the tank pressure control valves is the same in both alternative embodiments: Each tank pressure control valve surrounds two chambers which are separated by a membrane, with one of the chambers communicating with the tank connection and one communicating with the filter connection. The membrane has an opening and is pushed by a spring around the opening against the free end of a pipe socket, which traverses one of the chambers and through the opening leads into the other chamber, in which the spring is located. The connection between the two chambers and the tank connection or the filter connection, respectively, is reversed in the overpressure valve compared to the negative pressure valve. In the overpressure valve, the chamber which surrounds the pipe socket communicates with the fuel tank and the chamber which is provided with the spring communicates with the activated carbon filter. When an overpressure is established in the fuel tank, which exceeds the opening pressure of the overpressure valve, the membrane is lifted from the pipe socket by the overpressure against the force of the spring, such that the two chambers are connected to one another. In the negative pressure valve, the chamber which is provided with the spring communicates with the fuel tank and the chamber which surrounds the pipe socket communicates with the activated carbon filter. When a negative pressure is established in the fuel tank which exceeds the opening pressure of the negative pressure valve, the membrane is lifted from the pipe socket by the negative pressure against the force of the spring, such that the two chambers are also connected to one another.

Advantageously, valve units with two tank pressure control valves are used, so that the valve unit requires only two connections. To prevent condensate accumulations in the chambers of the tank pressure control valves, these are advantageously configured to communicate at their lowest point with one of the two connections through an opening or a passage.

BRIEF DESCRIPTION OF THE DRAWING

In the following, the invention is explained in more detail by way of several embodiments which are shown in the drawing. It shows FIG. 1 a side view of a valve unit with a tank shut-off valve and two tank pressure control valves.

DETAILED DESCRIPTION OF PREFERRED EMBODIMENTS

The valve unit 1 shown in the FIGS. 1 to 4 serves for ventilating or aerating a fuel tank (not shown) and is intended for mounting between the fuel tank and an activated carbon filter (not shown), which prevents the release of volatile hydrocarbons into the atmosphere or the environment when the fuel tank is vented or aerated.

The valve unit 1 essentially includes a tank shut-off valve 2 and two tank pressure control valves 3, 4 which are separate from one another and arranged at opposite sides of the tank shut-off valve 2.

The tank shut-off valve 2 is an electromagnetic valve, which includes two parts which are rotatably connected to one another, namely a valve part 5 with a valve seat 6, a valve member 7 which is movable relative to the valve seat 6, and two connections 8, 9, i.e. an tank connection 8 which is connectable to the fuel tank and a filter connection 9 which is connectable to an activated carbon filter, as well as a valve actuating part 10 with an electromagnetic coil 11 and an anchor 12 which acts on the valve member 7. When the electromagnetic coil is excited, the anchor lifts the valve member 7 from the valve seat 6, whereupon the two connections 8, 9 communicate with one another.

Figure 1:
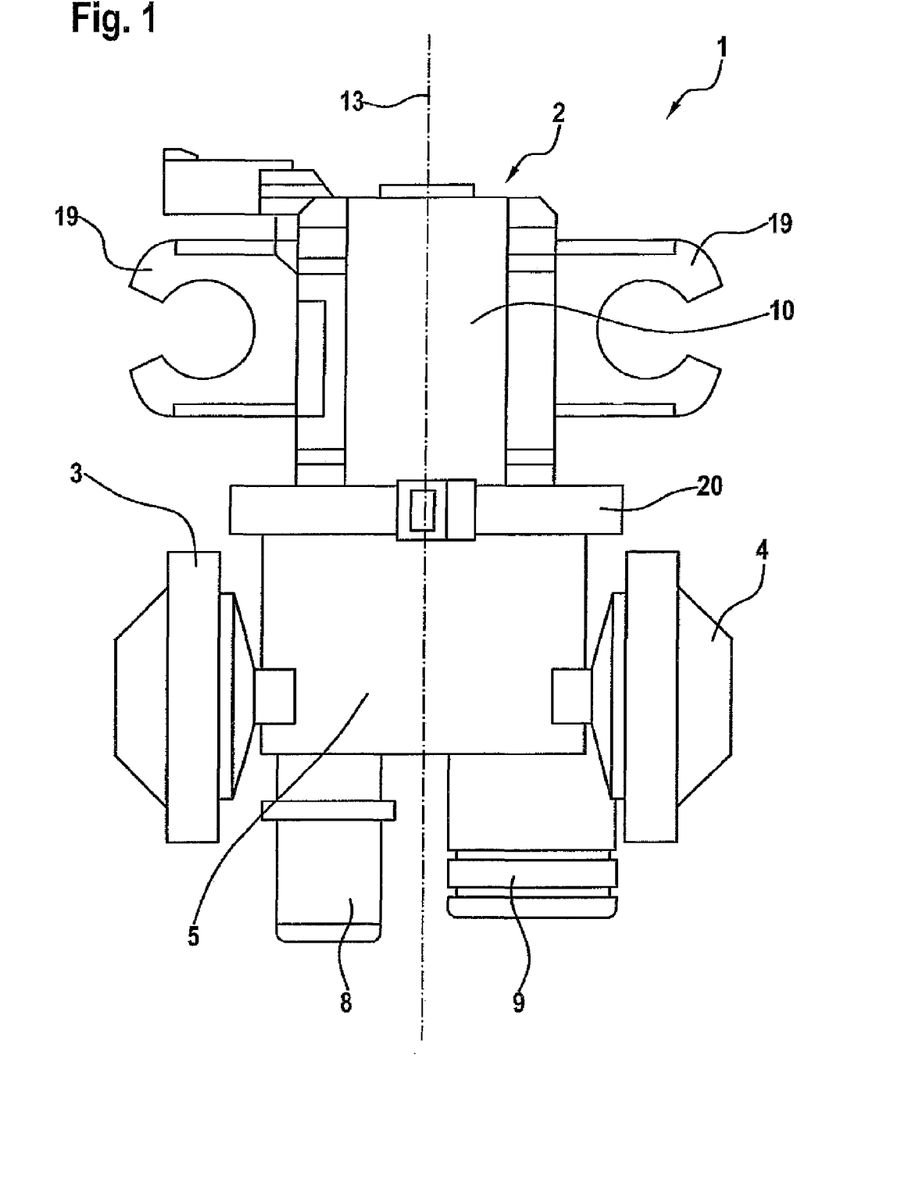
Figure 2:
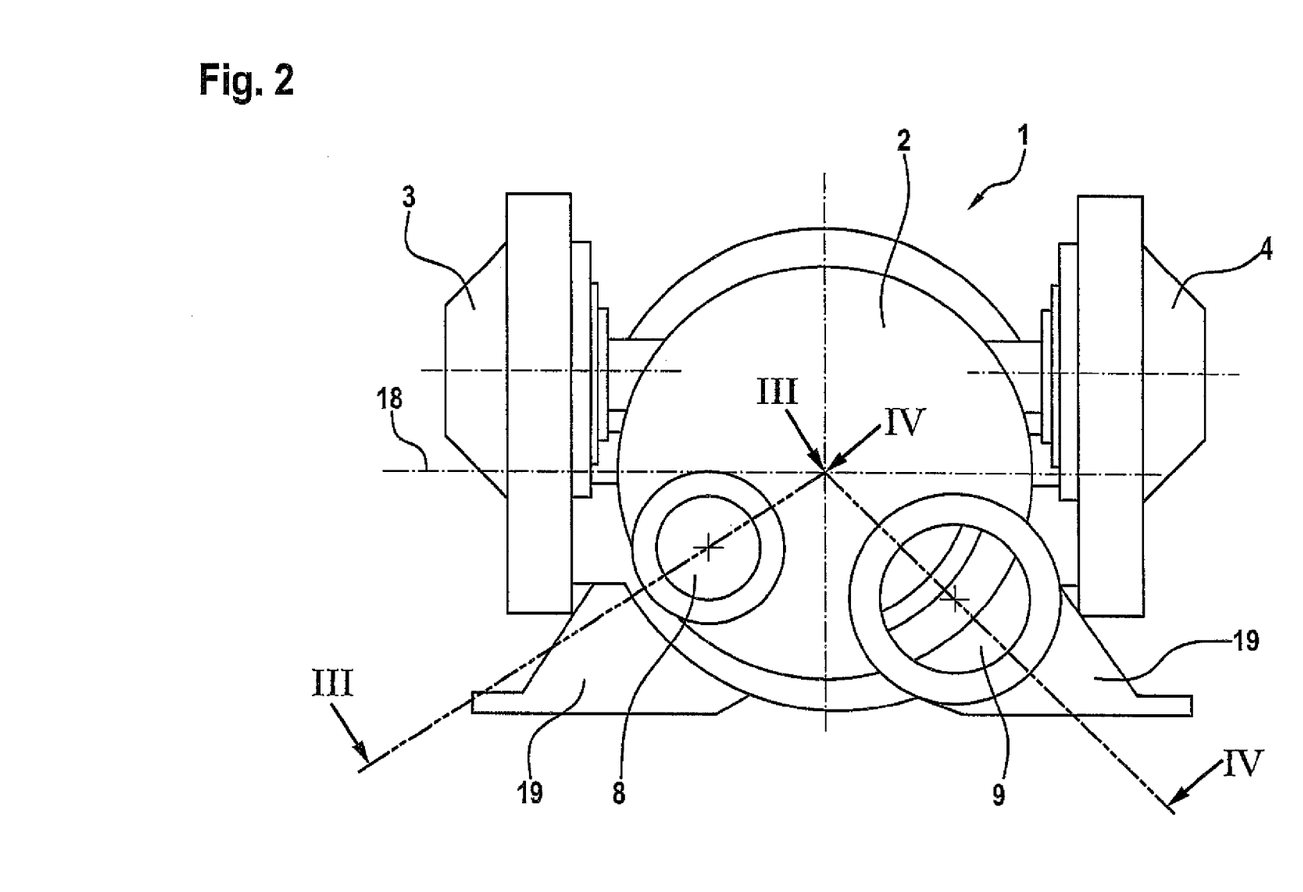
FIG. 2 a bottom view of the valve unit from FIG. 1.
Figure 3:
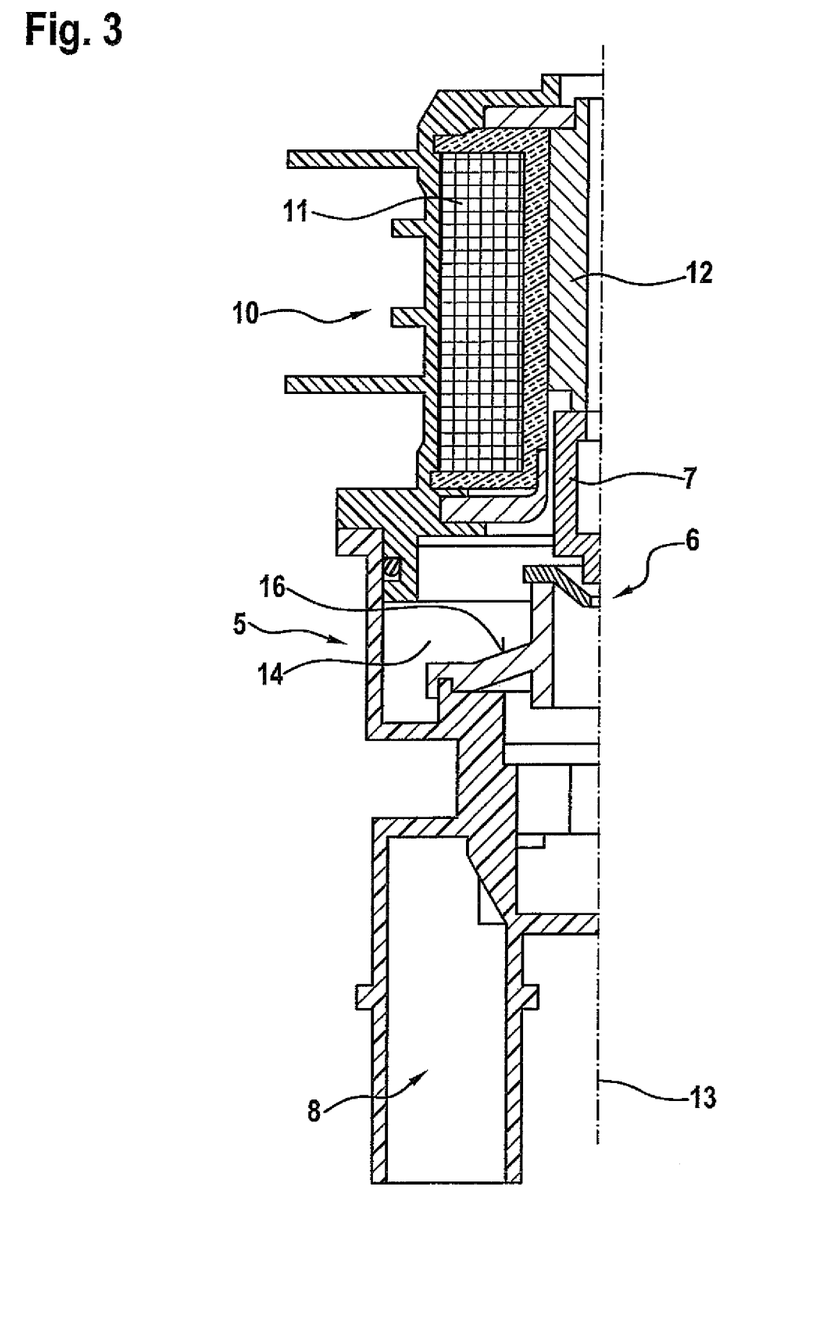
FIG. 3 a sectional view of the tank shut-off valve taken along the line III-III of FIG. 2 to explain the condensate runoff in vertical mounting.
Figure 4:
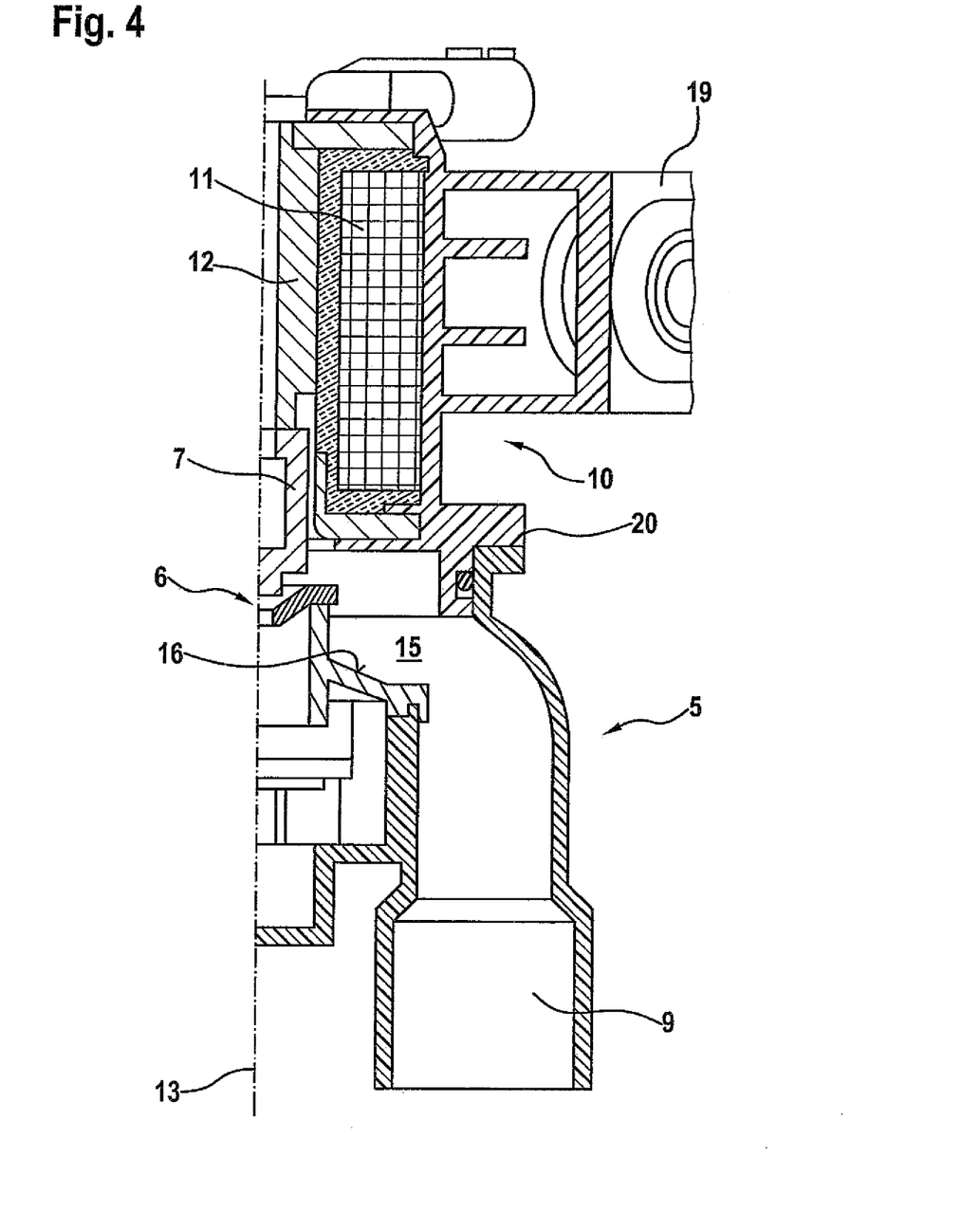
FIG. 4 a sectional view of the tank shut-off valve taken along the line IV-IV of FIG. 2 to explain the condensate runoff in vertical mounting.
Figure 5:
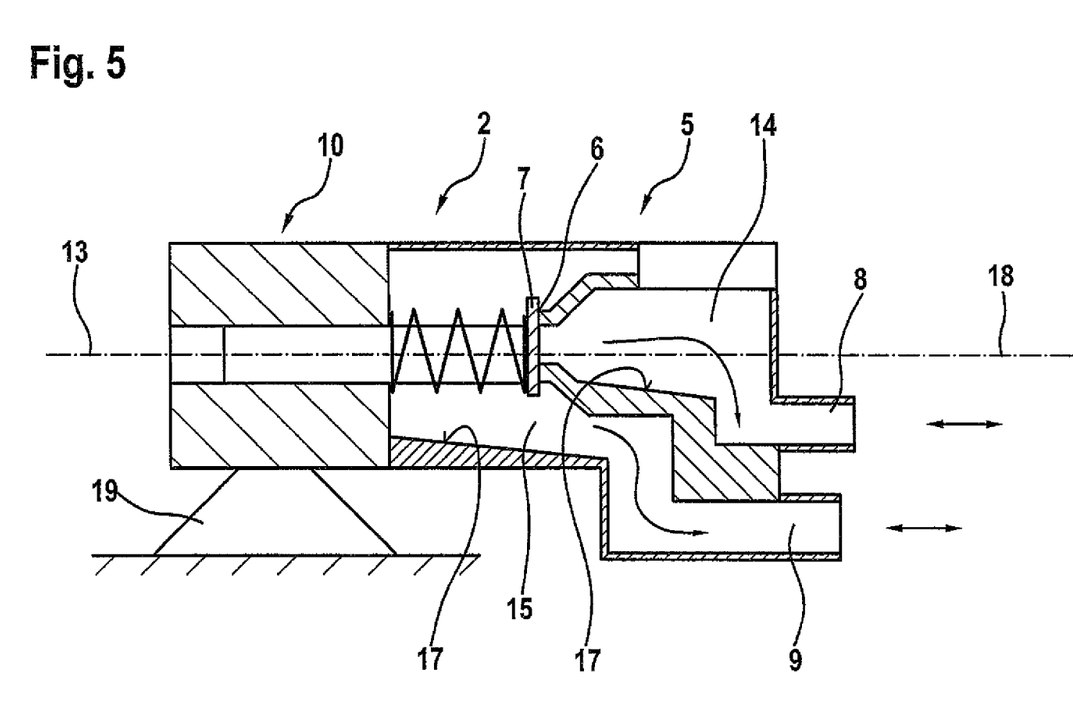
FIG. 5 a schematic section view of the tank shut-off valve to explain the condensate drainage in horizontal mounting.

As best shown in FIGS. 1, 3, 4 and 5, the valve unit 1 can be mounted in different mounting positions, namely vertically, as shown in FIGS. 1, 3 and 4, i.e. with vertical longitudinal middle axis 13, or horizontally, as schematically shown in FIG. 5 without the two tank pressure control valves 3, 4, i.e. with horizontal longitudinal middle axis 13. Of course, the valve unit can also be mounted in any oblique mounting position between vertically and horizontally.

To prevent, that liquid condensate can accumulate inside the tank shut-off valve 2 in one of this mounting positions, the tank shut-off valve 2 is constructed such that in vertical mounting position the tank connection 8 and the filter connection 9 are arranged at the bottom side of the valve part 5, project downward over the valve part 5 and both open downward, as shown in FIGS. 1, 3 and 4. Further, each of the two connections 8, 9 is connected to one of the internal spaces 14 or 15, respectively of the tank shut-off valve 2 which communicate with the tank connection 8 or the filter connection 9, respectively, such that in the internal spaces 14, 15 condensing fuel vapor entirely flows into the connection 8, 9 which, in vertical as well as horizontal mounting of the valve 1, leads into the internal space 14 or 15 respectively from below, as best shown in FIGS. 3 and 4 or 5, respectively. In order to facilitate the draining of condensate from the internal spaces 14, 15 into the connections 8, or 9 respectively, both internal spaces 14, 15 in the case of a vertical mounting (FIGS. 3 and 4), are delimited downward by slanted surfaces 16, and in the case of horizontal mounting are delimited downward by slanted surfaces 17, which are inclined downward toward the entry sites of the connections 8, 9. When the valve 2 is closed, the internal spaces 14, 15 are separated from one another by the valve member 7.

Further, the tank shut-off valve 2 is configured so that both connections 8, 9 are arranged on one side of a longitudinal middle axis 18 (FIG. 2) of the tank shut-off valve 2, which middle axis is oriented vertically in a vertical mounting, and such that the valve part 5 is rotatable relative to the valve actuating part 10 which is provided with fixing means, about the longitudinal axis 13 of the tank shut-off valve 2 and is fixable in any rotational position, as best shown in FIGS. 1, 3 and 4 by a clamping ring 20, so that the valve part 5 in the case of a horizontal mounting, can always be rotated into a position, in which both connections 8, 9 are arranged below the longitudinal middle axis and open toward one side regardless of the orientation of the fastening means 19 as shown in FIG. 5. Further, the tank connection 8 is connected to the internal space 14 and the filter connection 9 connected to the internal space 15, so that in the internal spaces 14, 15 condensing fuel flows entirely into the connection 8 or 9 respectively, which leads into the internal space 14, 15, as shown in FIG. 5. With this, dead fuel areas can be avoided in any mounting position between vertically and horizontally.

The two tank pressure control valves 3, 4 which are configured as valve unit with the tank shut-off valve 2, are bypass valves, one of which has a negative pressure valve 3 and the other one an overpressure valve 4. The negative pressure valve 3 opens also automatically in response to a defined negative pressure in the fuel tank. The overpressure valve 4 opens automatically in response to a defined overpressure in the fuel tank.

Figure 6A:
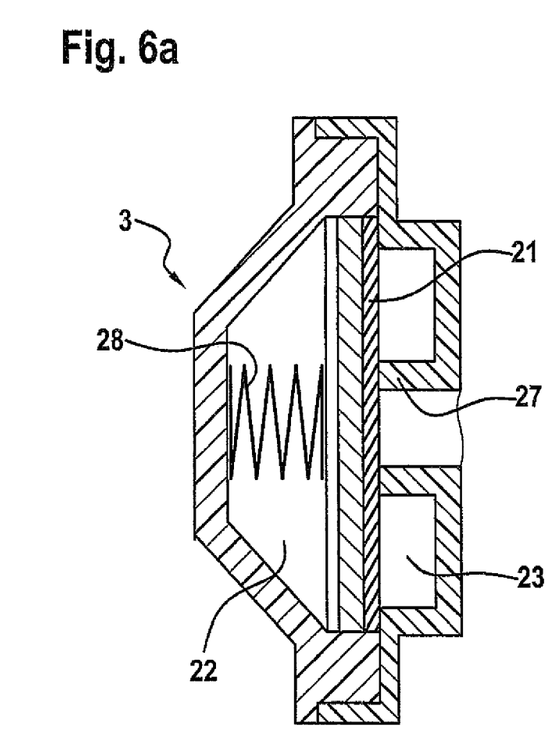
FIGS. 6a and 6b different section views of the two tank pressure control valves.
Figure 6B:
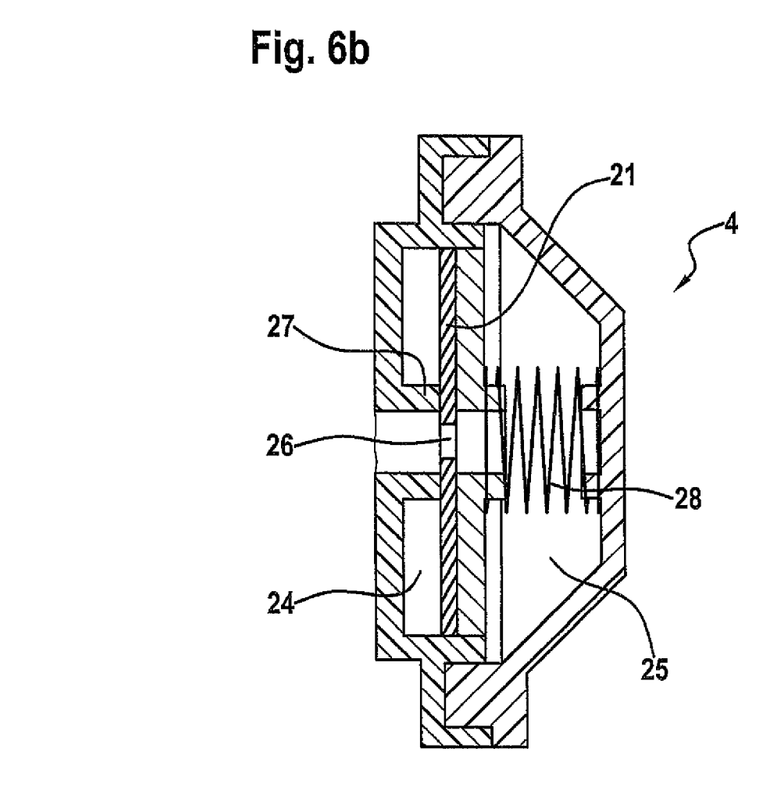

As best shown in FIGS. 6a and 6b, the two tank pressure control valves 3, 4, each have two chambers 22, 23; 24, 25 which are separated by a membrane 21, one of which chambers after mounting communicates with the fuel tank and another one of the chambers 23; 25 communicates with the activated carbon filter. In the negative pressure valve 3 in FIG. 6a the negative pressure chamber 22 which communicates with the fuel tank faces away from the tank shut-off valve 2, while the other chamber 23 which communicates with the activated carbon filter faces toward the tank shut-off valve 2. In the overpressure valve 4 in FIG. 6b on the other hand, the overpressure chamber 24 which communicates with the fuel tank faces toward the tank shut-off valve 2 while the other chamber 25 which communicates with the activated carbon filter faces away from the tank shut-off valve 2. As best shown in FIG. 6b, the membrane 21 of each valve 3, 4 has an opening 26 and when the valve 3, 4 is closed rests on a cylindrical pipe socket 27 around the opening 26 through which pipe socket 27, in the case of the negative pressure valve 3 in FIG. 6a the negative pressure chamber 22 communicates with the fuel tank, and in the case of the overpressure valve 4 in FIG. 6b, the other chamber 25 communicates with the activated carbon filter. The membrane 21 is pressed against the free end of the pipe socket 27 by a spring 28 and ensures that the two chambers 22, 23; 24, 25 do not, i.e. not normally communicate, with one another when the valve 3, 4 is closed. In the case of a greater negative pressure in the fuel tank, the membrane 21 of the negative pressure valve 3, as a result of the negative pressure in the negative pressure chamber 22 which communicates with the fuel tank is lifted from the pipe socket 27 against the force of the spring 28, whereby the two chambers 22, 23 are connected to one another upon opening of the valve 3. In the case of a greater overpressure in the fuel tank, the membrane 21 of the overpressure valve 4 is lifted from the pipe socket 27 by the pressure in the overpressure chamber 24 against the force of the spring 28, whereby the two chambers 24, 25 are also connected to one another upon opening of the valve 4.

The overpressure chamber 24 of the overpressure valve 4 and the negative pressure chamber 22 of the negative pressure valve 3 communicate through an internal space 14 of the tank shut-off valve 2 with the tank connection 8, while the other chamber 25 of the overpressure valve 4 and the other chamber 23 of the negative pressure valve 3 communicate with the filter connection 9 through the internal space 15 of the tank shut-off valve.

The valve unit can not only be mounted in vertical mounting position as shown in FIG. 1 and in horizontal mounting position as shown in FIG. 5 but also in any intermediate orientation, wherein in all cases the two connections 8, 9 point obliquely downwards and at the lowest point lead into the respective chambers so that a good condensate drainage is ensured.

Figure 7:
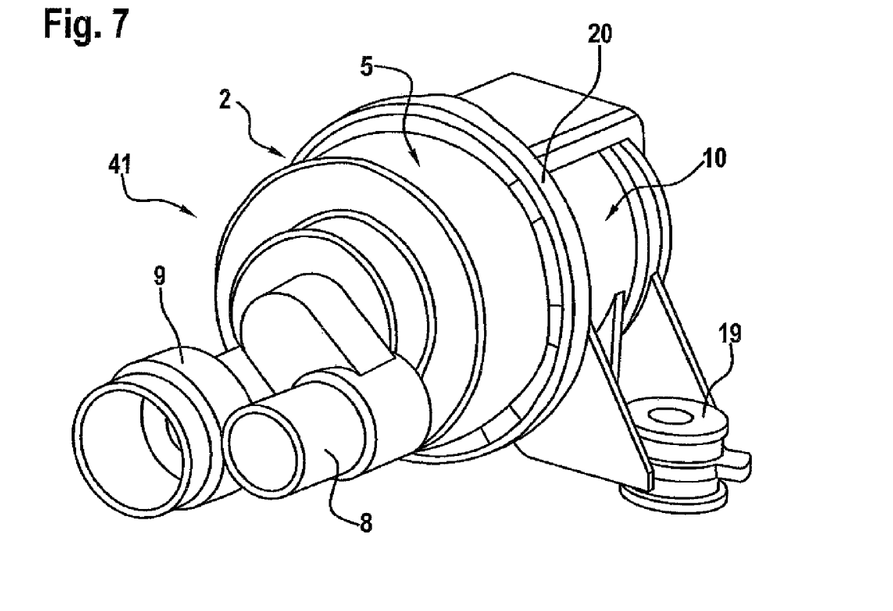
FIG. 7 a perspective view of another tank shut-off valve.

The tank shut-off valve 2 shown in FIG. 7 has the same configuration as the tank shut-off valve 2 in the FIGS. 1, 2, 3 and 5, however, it forms a separate valve unit 41 which can be mounted separated from a valve unit 29 which is formed by the two tank pressure control valves 3 and 4 and is shown in FIGS. 8 to 13, for example the valve unit 41 outside the fuel tank and one of the two valve units 29 or 30 respectively, inside the fuel tank.

Figure 8:
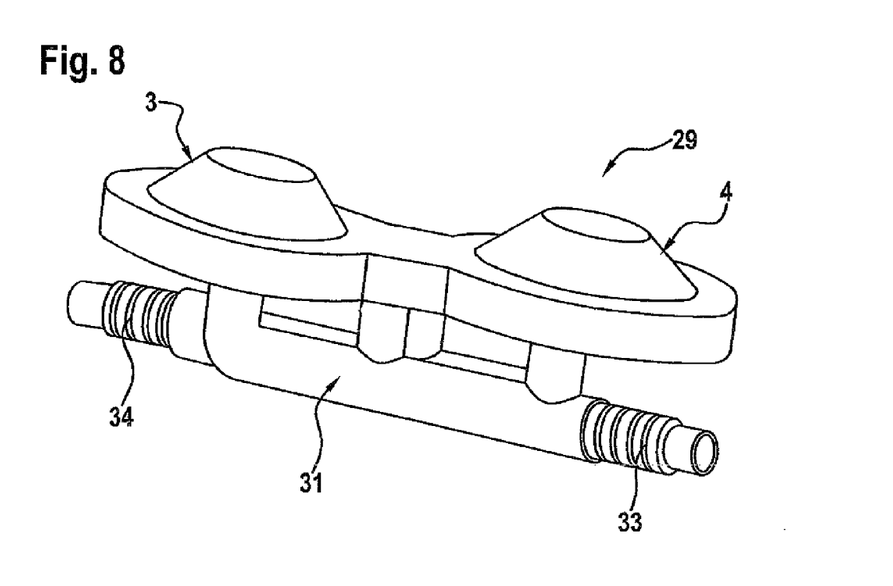
FIG. 8 a perspective view of a valve unit including two tank pressure control valves.
Figure 9:
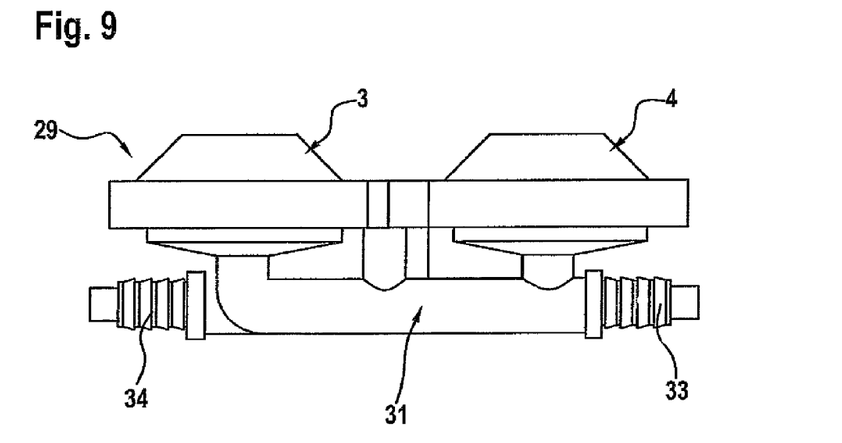
FIG. 9 a side view of the valve unit from FIG. 8.
Figure 10:
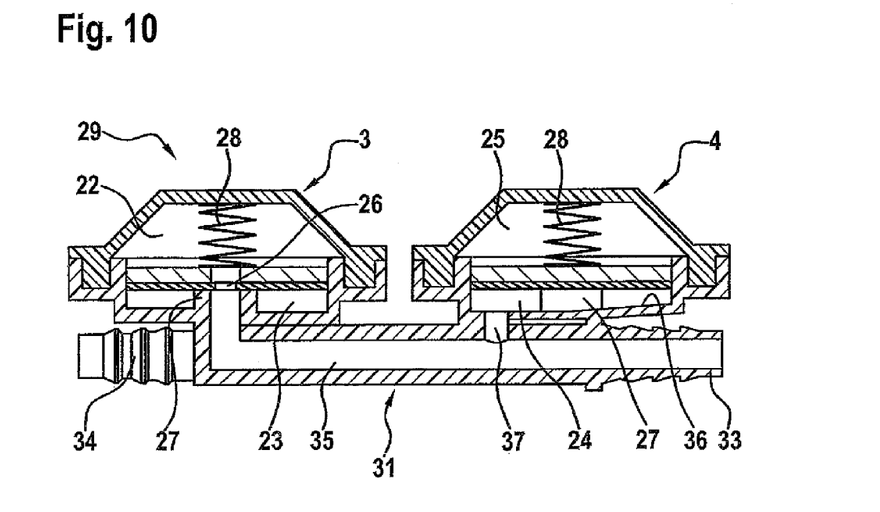
FIG. 10 a longitudinal section view of the valve unit from FIGS. 8 and 9.
Figure 11:
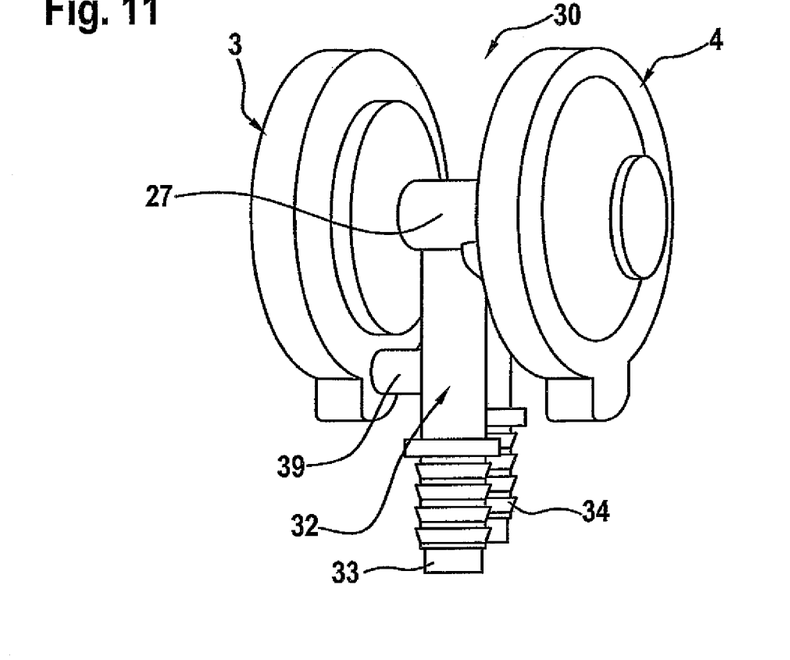
FIG. 11 a perspective view of another valve unit including two tank pressure control valves.
Figure 12:
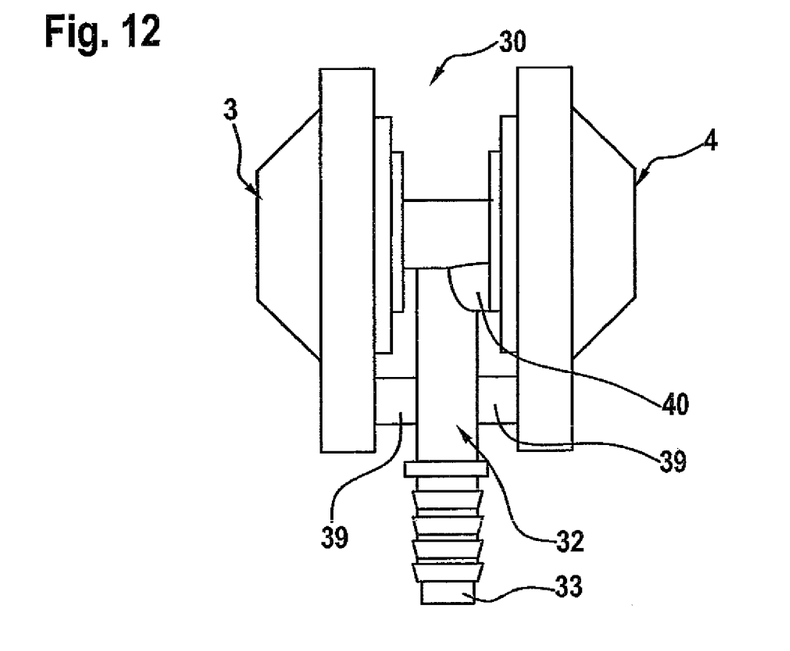
FIG. 12 a side view of the valve unit from FIG. 11.
Figure 13:
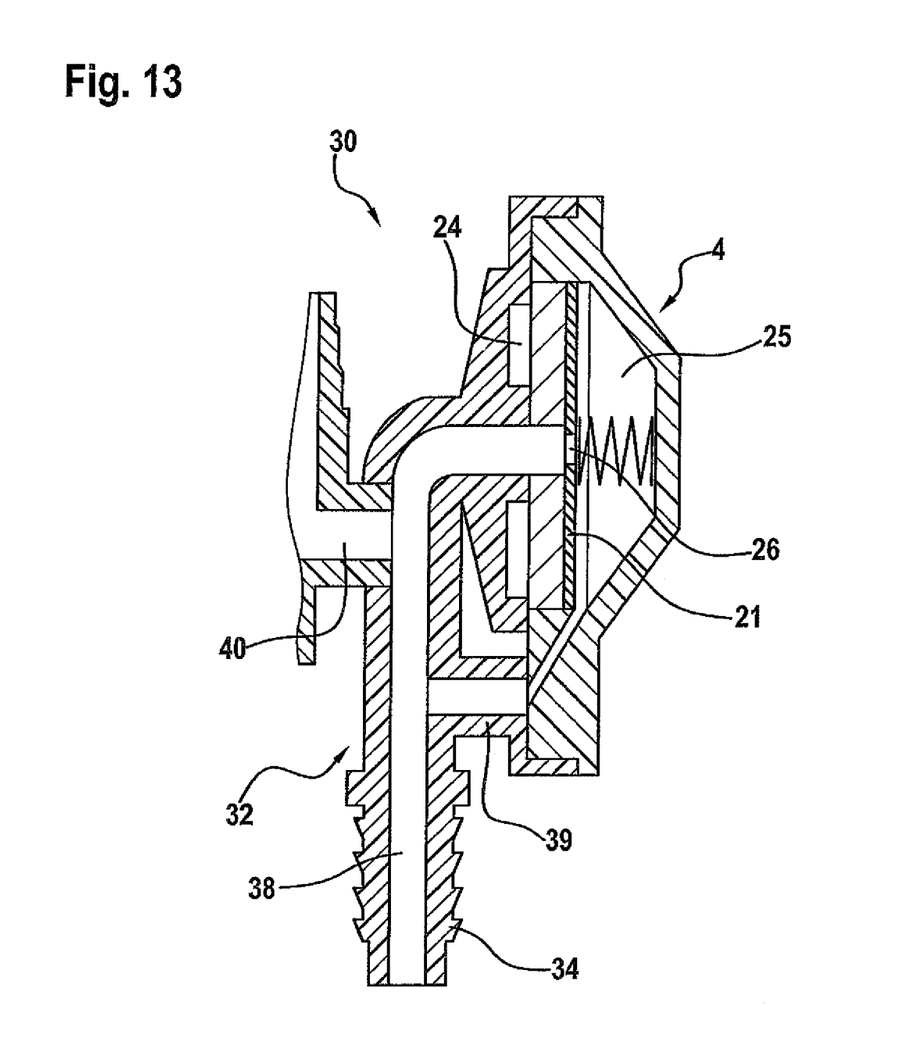
FIG. 13 a cross sectional view of the valve unit from FIGS. 11 and 12.

In the valve unit 29 shown in FIGS. 8 to 10, the two tank pressure control valves, i.e. the negative pressure valve 3 and the overpressure valve 4, have the same orientation and are arranged adjacent one another along a connection part 31, while in the valve unit 30 in FIGS. 11 to 13 the two tank pressure control valves 3, 4 have opposite orientations and are arranged at an end of a connection part 32.

In the two valve units 29, 30 the negative pressure chamber 22 of the negative pressure valve 3 which communicates with the fuel tank and the overpressure chamber 24 of the overpressure valve 4 which also communicates with the fuel tank are connected to a common tank connection 33 of the valve unit 29, 30 while the other chamber 23 of the negative pressure valve 3 which communicates with the activated carbon filter and the other chamber 25 of the overpressure chamber 4 which also communicates with the activated carbon filter are connected to a common filter connection 34 of the valve unit 29, 30.

As best shown in FIG. 10, in the valve unit 29 in FIGS. 8 to 10, the pipe socket 27 of the negative pressure valve 3 leads into the negative pressure chamber 22 from below while its lower end communicates with the tank connection 33 through a tube 35 in the connection part 31, which tube 35 is oriented horizontally after the mounting of the valve unit 29, so that condensing fuel can drain from the negative pressure chamber 22 through the pipe socket 27 to the tank connection 33. The overpressure pressure chamber 24 of the overpressure valve 4 is delimited at its bottom side by a slanted bottom 36 and communicates at its lowest point through a passage 37 with the tube 35 which leads to the tank connection 33, so that condensate can also drain completely from the overpressure chamber 24 to the tank connection 33.

Conversely, in the valve unit 29, the pipe socket 27 of the overpressure valve 4 leads into the other chamber 25 from below, while its lower end communicates with a filter connection 34 through a tube (not visible) in the connection part 31, which tube after mounting of the valve unit 29, is oriented parallel to the tube 35, so that condensing fuel can drain from the chamber 25 through the pipe socket 27 to the filter connection 34. The other chamber 23 of the negative pressure valve 3 is also delimited at its bottom side by a slanted bottom (not visible) and communicates at its lowest point through a passage (not visible) with the tube which leads to the filter connection 34, so that condensate can also completely drain from the chamber 23 to the filter connection 34.

As best shown in FIG. 13, in the valve unit 30 in FIGS. 11 to 13, the chamber 25 of the overpressure valve 4 communicates at the lowest point of the chamber 25 with a vertical tube 38 in the connection part 32 which tube leads to the filter connection 34, not only through the pipe socket 27 but also through a further passage 39, so that condensate can drain from the chamber 25 through the passage 39 and the tube 38 to the filter connection 34. Similar to the overpressure chamber 24 in the overpressure valve 4 of the valve unit 29, the overpressure chamber 24 of the overpressure valve 4 is connected to the vertical tube 38 in the connection part 32, through a single passage 40 which is arranged at the lowest point of the chamber 24, as shown in FIG. 12.

The negative pressure valve 3 (only partially shown in FIG. 13) has a corresponding configuration, wherein however, the other chamber 23 at its lowest point communicates through a passage 40 with the vertical tube 38 which leads to the filter connection 34, while the negative pressure chamber (not visible) communicates through the pipe socket 27 and a further passage 39 at the lowest point of the negative pressure chamber with a tube in the connection part 32 which tube leads to the tank connection 33 and is parallel to the tube 38, as best shown in FIGS. 11 and 12.

The invention claimed is:

1. A device for ventilating and aerating a fuel tank, comprising:
    a tank shut-off valve having a longitudinal middle axis; and
    two tank pressure control valves spaced from the tank shut-off valve in a direction of the longitudinal middle axis and spaced from one another in a direction which is transverse to the longitudinal middle axis, one of the tank pressure control valves configured to open in response to a negative pressure in the fuel tank, and another one of the tank pressure control valves configured to open in response to an overpressure in the fuel tank, wherein at least one of the tank shut-off valve and the tank pressure control valves forms a valve unit which is mountable in a horizontal or vertical position and has a fuel connection in communication with the fuel tank and a filter connection in communication with an activated carbon filter,
    wherein the fuel connection and the filter connection are positioned generally parallel to one another and are spaced from one another also in the direction which is transverse to the longitudinal middle axis, with the fuel connection and the filter connection pointing downward in a vertical mounting position of the valve unit and pointing sideways in a horizontal mounting position of the valve unit, said fuel connection and filter connection being arranged at or near a bottom side of the valve unit.

2. The device of claim 1, wherein the valve unit comprises two parts which are rotatable relative to one another, one of said parts being constructed for fastening the valve unit onto a mounting, and the other one of said parts being provided with the fuel connection and the filter connection.

3. The device of claim 2, further comprising fasteners for securing the two parts in any rotational position relative to one another.

4. The device of the claim 1, wherein the fuel connection and the filter connection point in a same direction in the horizontal mounting position of the valve unit.

5. The device of claim 1, wherein the fuel connection and the filter connection point in opposite directions in the horizontal mounting position of the valve unit.

6. The device of claim 1, wherein each of the tank pressure control valves has two chambers separated by a membrane, wherein two of the chambers of the tank pressure control valves communicate with the fuel connection and another two of the chambers of the tank pressure control valves communicate with the filter connection.

7. The device of claim 6, wherein one chamber of each of the tank pressure control valves communicates with the fuel connection and another chamber of each of the tank pressure control valves communicates with the filter connection, wherein the one chamber which communicates with the fuel connection of one of the control valves faces away from the shut-off valve and another chamber which communicates with the filter connection of the one control valve faces toward the shut-off valve, while the one chamber which communicates with the fuel connection of another control valve faces toward the shut-off valve and another chamber which communicates with the filter connection of another control valves faces away from the shut-off valve.

8. The device of claim 6, wherein each of the chambers at a respective lowest point thereof communicates with one of the fuel and filter connection through an opening or a passage.

9. The device of claim 6, wherein one chamber of each of the tank pressure control valves communicates at a lowest point of said one chamber with the fuel connection and another chamber of each of the tank pressure control valves communicates at another lowest point of said another chamber with the filter connection.

10. The device of claim 1, wherein the fuel connection and the filter connection lead into internal spaces of the valve unit at entry sites, said entry sites being arranged at a lowest point of the internal spaces in the vertical mounting position as well as in the horizontal mounting position.

11. The device of claim 10, wherein the entry sites are partially surrounded by slanted surfaces which are tilted downwards toward the entry sites.

12. The device of claim 1, wherein the valve unit is comprised of the tank pressure control valves and the tank shut-off valve, with the tank shut-off valve, including the fuel connection and the filter connection, said tank pressure control valves communicating with the fuel connection and the filter connection through the tank shut-off valve.

13. The device of claim 1, wherein the valve unit is formed by the tank shut-off valve exclusively.

14. The device of claim 1, wherein the valve unit is formed by the pressure control valves exclusively.

15. The device of claim 1, wherein the fuel connection and the filter connection are located between the two tank pressure control valves as considered in the direction which is transverse to the longitudinal middle axis.

* * * * *